United States Patent [19]

Kashihara

[11] Patent Number: 4,776,421
[45] Date of Patent: Oct. 11, 1988

[54] ROAD SPEED DETECTION DEVICE AND METHOD FOR 4WD VEHICLE, DETERMINING ROAD SPEED ACCORDING TO THE LESSER OF THE FRONT WHEELS ROTATIONAL SPEED AND THE REAR WHEELS ROTATIONAL SPEED

[75] Inventor: Yuji Kashihara, Toyota, Japan

[73] Assignee: Toyota Jidosha Kabushiki Kaisha, Aichi, Japan

[21] Appl. No.: 28,709

[22] Filed: Mar. 23, 1987

[30] Foreign Application Priority Data

Mar. 25, 1986 [JP] Japan .................................. 61-066527
May 1, 1986 [JP] Japan .................................. 61-102804

[51] Int. Cl.⁴ ............................................ B60K 17/35
[52] U.S. Cl. .................................... 180/197; 180/249; 192/3.52; 324/161
[58] Field of Search ............... 180/233, 248, 249, 197; 324/161, 166, 174; 303/94, 95, 96; 192/48.3, 48.5, 3.52

[56] References Cited

U.S. PATENT DOCUMENTS 3,617,099 11/1971 Sugiyama ........................ 324/161 X
4,164,872 8/1979 Weigl .............................. 180/197 X
4,467,886 8/1984 DeClaire et al. ................... 180/197

FOREIGN PATENT DOCUMENTS 56-131424 10/1981 Japan ................................... 180/197
58-128948 8/1983 Japan ................................... 180/197

Primary Examiner—John J. Love
Assistant Examiner—Charles R. Watts
Attorney, Agent, or Firm—Parkhurst, Oliff & Berridge

[57] ABSTRACT

In a full time type four wheel drive power transmission system having a planetary gear mechanism for dividing input power supplied to the carrier into a first output power delivered from the sun gear for one pair of four wheels and a second output power delivered from the ring gear for another pair of four wheels or directly connecting the sun gear and the ring gear to the carrier by selectively rotationally connecting the sun gear and the ring gear by a clutch, the ring gear and the casing of the clutch are respectively provided with a series of teeth or other surface projections or unevenness, and two sensors are provided respectively to detect each unevenness for detecting rotational speed of the sun gear and the ring gear.

3 Claims, 3 Drawing Sheets

ROAD SPEED DETECTION DEVICE AND METHOD FOR 4WD VEHICLE, DETERMINING ROAD SPEED ACCORDING TO THE LESSER OF THE FRONT WHEELS ROTATIONAL SPEED AND THE REAR WHEELS ROTATIONAL SPEED

BACKGROUND OF THE INVENTION

The present invention relates to a road speed detection device and method for a vehicle adapted for four wheel drive operation and incorporating a four wheel drive power transmission system, and more particularly relates to such a detection device and method for the road speed of a vehicle such as an automobile incoprorating such a four wheel drive power transmission system, said road speed generally being required to be detected in order to provide proper operation of an automatic transmission mechanism of said vehicle, said road speed detection device and method not being adversely affected by slipping or skidding either of the front wheels of the vehicle or of the rear wheels of the vehicle.

The present invention has been described in Japanese Patent Applications Ser. Nos. Showa 61-066527 and Showa 61-102804 (1986), both filed by an applicant the same as the entity assigned or owed duty of assignment of the present patent appication; and the present patent application hereby incorporates into itself by reference the text of said Japanese Patent Applications and the claims and the drawings thereof; copies are appended to the present application.

Nowadays a greatly increasing number of automotive vehicles are being constructed with four wheel drive transmission systems, because such four wheel drive operation, in which all four wheels of the vehicle are powered from its engine via its transmission, is very suitable for driving on poor or slippery road surfaces such as in mud or over bad ground, or upon roads covered with mud, snow, ice or rain. In other words, four wheel drive operation provides a much higher degree of stability and drivability for the vehicle in conditions where the coefficient of friction between the wheels and the surface upon which the vehicle is riding is relatively low. Also, four wheel drive operation is beneficial for aiding with hill climbing characteristics and high speed stability characteristics. Therefore, the so called full time four wheel drive type of transmission, which remains always engaged to four wheel drive without any episodes of two wheel driving, is becoming more and more popular.

In such a four wheel drive transmission system for an automotive vehicle, it is usual to provide a center differential device for distributing rotational power between the front wheels of the vehicle and the rear wheels of the vehicle, as well as the per se conventional rear differential device that provides differential action between the two rear vehicle wheels and the also per se conventional front differential device that provides differential action between the two front vehicle wheels. Such a central or front - rear differential device is provided in order to provide a differential action between said front vehicle wheels (considered as a pair) and said rear vehicle wheels (also considered as a pair) when the vehicle is turning around a curve, in order to eliminate the possibility of the occurrence of the so called tight corner braking phenomenon created by the difference in the turning radiuses of the front wheels of the vehicle and the rear wheels thereof (and also for various other reasons). And such provision of such a central or front - rear differential device is effective for achieving this result.

Further, it has been practiced to provide an automatic transmission system to a vehicle which is equipped with such a four wheel drive type transmission. Such a type of structure is disclosed, for example, in Japanese Patent Application Laying Open Publication Ser. No. 56-138020 (1981). In such an automatic transmission system for a vehicle which is equipped with such a four wheel drive type transmission, as is per se conventional, the speed stage of the transmission mechanism is selected and is set by a transmission control device, based upon preset patterns stored in a memory thereof, according to the current values of various vehicle operating parameters including a parameter representing engine load (such as the opening of a throttle valve of the engine of the vehicle) and a parameter representing vehicle road speed. Therefore, it is required to ascertain the value of such a parameter representative of vehicle road speed; and conventionally this has been done by detecting the rotational speed of a member which rotates at a speed proportional to the rotational speed of one or another of the vehicle road wheels, or alternatively by detecting the rotational speed of a member which rotates at a speed proportional to the average rotational speed of the rear wheels of the vehicle, or at a speed proporational to the average rotational speed of the front wheels of the vehicle. Such a member, for example, may be an output member of such a central or front - rear differential device for driving a differential device which distributes rotational power between the two rear wheels of the vehicle, or may be an output member of such a central or front - rear differential device for driving a differential device which distributes rotational power between the two front wheels of the vehicle.

However, a problem that arises with such a simplistic device and method for detecting vehicle road speed, in such a vehicle which is equipped with a four wheel drive power transmission system, is that, if at any time even one only of the four vehicle wheels should break away from the road surface and should start to spin, i.e. should slip or should skid, then the rotational speed of that wheel, and also the average rotational speed of that wheel and the other wheel on its axle (the other front wheel or the other rear wheel) will substantially increase. If, therefore, the control of the automatic transmission system for the vehicle is being done based upon the rotational speed of said one of the wheels which is slipping or skidding, or upon the average of the rotational speed of said one of the wheels which is slipping or skidding and of the rotational speed of the other wheel on its axle, then a spurious value of vehicle road speed will be utilized for such vehicle automatic transmission system control, and this is likely to result in the automatic transmission of the vehicle being set to an inappropriate speed stage for the actual current true value of the vehicle road speed. This type of problem is particularly likely to arise in the event that the road conditions are poor due to rain, snow, dust, dirt, or the like which deteriorate the coefficient of friction of the vehicle wheels on the road surface, and thereby vehicle drivability can be severely reduced.

SUMMARY OF THE INVENTION

The inventors of the present invention have considered the various problems detailed above in the aforementioned type of four wheel drive type vehicle incorporating such a four wheel drive power transmission system and fitted with such an automatic transmission system.

Accordingly, it is the primary object of the present invention to provide an improved vehicle road speed detection method for a four wheel drive type vehicle, and a corresponding device for implementing said method, which avoid the problems detailed above.

It is a further object of the present invention to provide such a vehicle road speed detection device and method, which can accurately detect vehicle road speed even if one of the vehicle wheels is spinning relatively quickly due to slippage of that vehicle wheel upon the road surface.

It is a further object of the present invention to provide such a vehicle road speed detection device and method, which can accurately detect vehicle road speed even in adverse driving conditions in which the surface of the road which is being driven upon is relatively slippery.

It is a further object of the present invention to provide such a vehicle road speed detection device and method, which are not liable to generation of a spurious signal representing vehicle road speed, even in conditions of relatively poor adhesion of the vehicle wheels to the surface of the road.

It is further object of the present invention to provide such a vehicle road speed detection device and method, which ensure that vehicle drivability is not ever adversely deteriorated due to improper speed stage engagement.

It is a further object of the present invention to provide such a vehicle road speed detection device and method, which allow easy signal processing.

It is a further object of the present invention to provide such a vehicle road speed detection device and method, which are simple in construction.

It is a further object of the present invention to provide such a vehicle road speed detection device and method, which are economical of constructional materials.

It is a further object of the present invention to provide such a vehicle road speed detection device and method, which are easy to assemble.

It is a further object of the present invention to provide such a vehicle road speed detection device and method, which are compact.

It is a further object of the present invention to provide such a vehicle road speed detection device and method, which are easily serviced.

It is a further object of the present invention to provide such a vehicle road speed detection device and method, which allows the vehicle as a whole to be of low cost.

According to the most general device aspect of the present invention, these and other objects are attained by, for a four wheel drive power transmission system for a vehicle with two front wheels, two rear wheels, and an engine, comprising a power distribution device for four wheel drive which receives rotational power from said engine and which provides said rotational power to the combination of the front wheels of said vehicle and also to the combination of the rear wheels of said vehicle, said power distribution device for four wheel drive comprising a front wheels rotational power output member which rotates to drive said combination of said front wheels of said vehicle and a rear wheels rotational power output member which rotates to drive said combination of said rear wheels of said vehicle: a vehicle road speed detection device, comprising: (a) a first rotational speed detecton means for detecting the rotational speed of said front wheels rotational power output member; (b) a second rotational speed detection means for detecting the rotational speed of said rear wheels rotational power output member; and: (c) a means for determining which is the lesser one of said rotational speed of said front wheels rotational power output member as detected by said first rotational speed detection means and said rotational speed of said rear wheels rotational power output member as detected by said second rotational speed detection means, and for taking said lesser one of said rotational speeds as representing the road speed of said vehicle; and, according to the most general method aspect of the present invention, these and other objects are attained by, for a four wheel drive power transmission system for a vehicle with two front wheels, two rear wheels, and an engine, comprising a power distribution device for four wheel drive which receives rotational power from said engine and which provides said rotational power to the combination of the front wheels of said vehicle and also to the combination of the rear wheels of said vehicle, said power distribution device for four wheel drive comprising a front wheels rotational power output member which rotates to drive said combination of said front wheels of said vehicle and a rear wheels rotational power output member which rotates to drive said combination of said rear wheels of said vehicle: a vehicle road speed detection method, wherein: (a) the rotational speed of said front wheels rotational power output member is detected; (b) the rotational speed of said rear wheels rotational power output member is detected; and: (c) the lesser one of said rotational speed of said front wheels rotational power output member and said rotational speed of said rear wheels rotational power output member is taken as representing the road speed of said vehicle.

According to such a device and such a method, since the vehicle road speed is determined according to that one of the rotational speed of said front wheels rotational power output member and the rotational speed of said rear wheels rotational power output member which is the lesser one thereof and accordingly (in the event of substantial disagreement between said rotational speeds) is the one thereof whose value is not being caused to be a spurious representation of vehicle road speed due to slippage of one or more of the vehicle wheels upon the surface of the road, it becomes possible according to the present invention to accurately detect vehicle road speed even if one of the vehicle wheels is spinning relatively quickly due to slippage of that vehicle wheel upon the road surface. Accordingly, it becomes possible to accurately detect vehicle road speed even in adverse driving conditions in which the surface of the road which is being driven upon is relatively slippery, thus entailing relatively poor adhesion of the vehicle wheels to the surface of the road. In such conditions, this vehicle road speed detection device and method according to the present invention ensure that vehicle drivability is not ever adversely deteriorated due to improper speed stage engagement.

Further, according to a particular device specialization of the present invention, the above specified and other objects may be more particularly attained by a vehicle road speed detection device as described above, wherein said first rotational speed detection means comprises a first member formed with teeth or some other non-smooth surface projections or unevenesses and rotating along with said front wheels rotational power output member and a first sensor located proximate to the rotational path of said first member and adapted to sense the passing of said unevennesses of said first member, and said second rotational speed detection means comprises a second member formed with unevennesses and rotating along with said rear wheels rotational power output member and a second sensor located proximate to the rotational path of said second member and adapted to sense the passing of said unevenesses of said second member; and, according to a particular method specialization of the present invention, the above specified and other objects may be more particularly attained by a vehicle road speed detection method as described above, wherein said first rotational speed detection means comprises a first member formed with unevennesses and rotating along with said front wheels rotational power output member and a first sensor located proximate to the rotational path of said first member and adapted to sense the passing of said unevennesses of said first member, and said second rotational speed detection means comprises a second member formed with unevennesses and rotating along with said rear wheels rotational power output member and a second sensor located proximate to the rotational path of said second member and adapted to sense the passing of said unevennesses of said second member.

According to such a device and such a method, the rotational speeds of said front wheels rotational power output member and of said rear wheels rotational power output member can be easily detected.

Further, according to a more particular device specialization of the present invention, the above specified and other objects may be more particularly attained by a vehicle road speed detection device as described proximity above, wherein the number of unevennesses of said first member which pass said first sensor as said first member makes one revolution is substantially the same as the number of unevennesses of said second member which pass said second sensor as said second member makes one revolution. Optionally but desirably, further, said first sensor and said second sensor may be mounted substantially close to one another. In such a case, further optionally but desirably, said first member and said second member may rotate substantially coaxially about a common rotational axis, and said first sensor and said second sensor may be positioned at substantially the same distance from said common rotational axis. And, alternatively, optionally but desirably, the output signals of said first sensor and said second sensor may be periodic signals, and said means for determining which is the lesser one of said rotational speed of said front wheels rotational power output member and said rotational speed of said rear wheels rotational power output member may do so by directly comparing the frequencies of said periodic signals outputted by said first sensor and said second sensor. Correspondingly, according to a more particular method specialization of the present invention, the above specified and other objects may be more particularly attained by a vehicle road speed detection method as proximately described above, wherein the number of unevennesses of said first member which pass said first sensor as said first member makes one revolution is substantially the same as the number of unevennesses of said second member which pass said second sensor as said second member makes one revolution. Optionally but desirably, further, said first sensor and said second sensor may be mounted substantially close to one another. In such a case, further optionally but desirably, said first member and said second member may rotate substantially coaxially about a common rotational axis, and said first sensor and said second sensor may be positioned at substantially the same distance from said common rotational axis. And, in this case, yet further optionally but desirably, the output signals of said first sensor and said second sensor may be periodic signals, and it may be detected which is the lesser one of said rotational speed of said front wheels rotational power output member and said rotational speed of said rear wheels rotational power output member by directly comparing the frequencies of said periodic signals outputted by said first sensor and by said second sensor.

In these various cases, easy signal processing is facilitated, and furthermore this vehicle road speed detection device, and a means to implement this vehicle road speed detection method, are simple in construction, and further are economical of constructional materials, are easy to assemble, and are compact and are easily serviced. Accordingly, the vehicle as a whole is enabled to be of low cost.

BRIEF DESCRIPTION OF THE DRAWINGS

The present invention will now be described with respect to the preferred embodiments of the device and of the method thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts and so on in the various figures; and:

DESCRIPTION OF THE PREFERRED EMBODIMENT

The present invention will now be described with reference to the preferred embodiments of the device and of the method thereof, and with reference to the figures.

Overall Vehicle Power Train Structure

Figure 1:
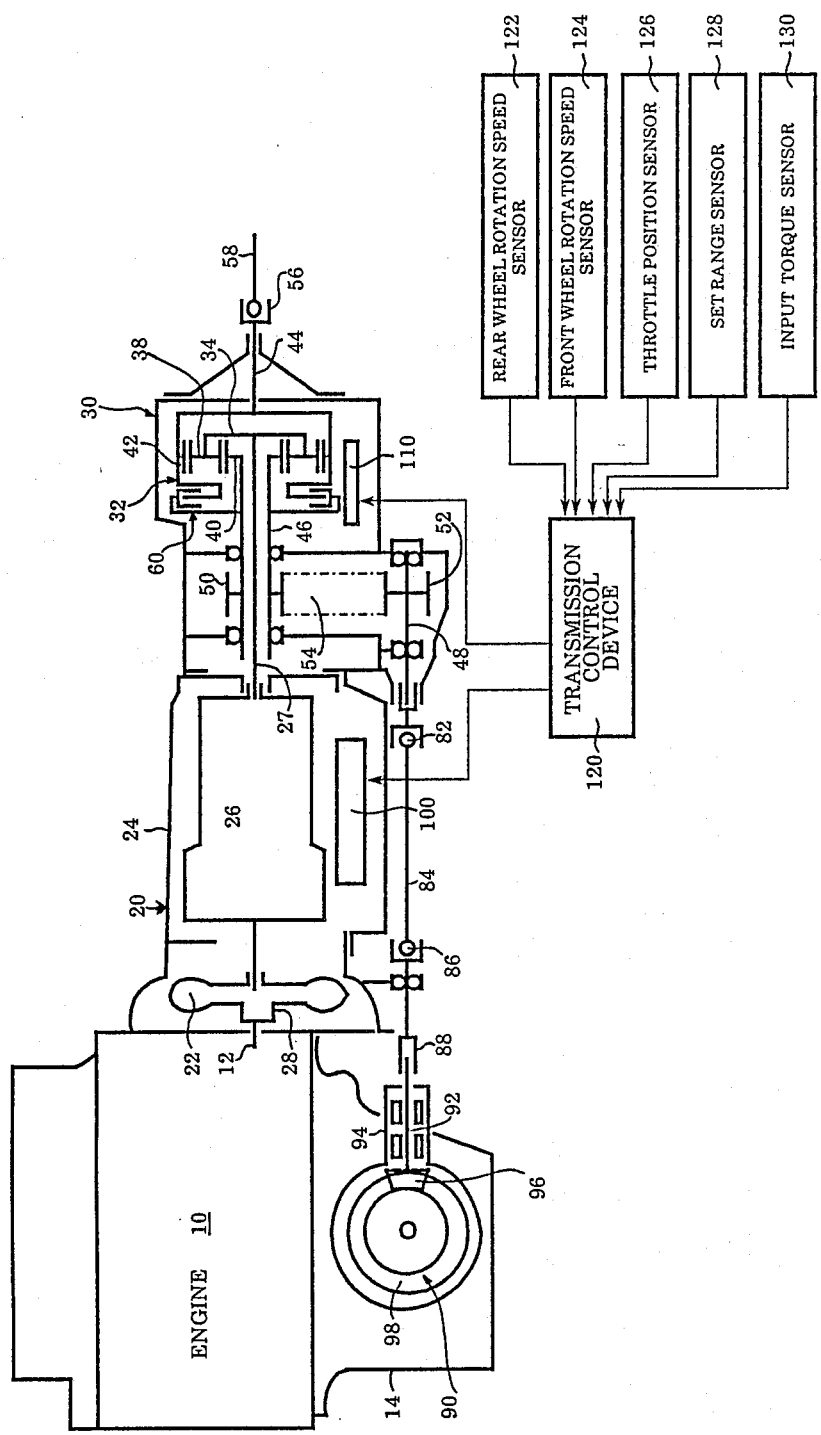
FIG. 1 is a schematic longitudinal skeleton view of a vehicle power train and of a control system therefor which incorporates the preferred embodiment of the vehicle road speed detection device of the present invention, for practicing the preferred method embodiment.

FIG. 1 is a schematic longitudinal skeleton view of a power train of a vehicle, which incorporates the preferred embodiment of the four wheel drive vehicle road speed detection device of the present invention, said device performing the preferred method embodiment. In this figure, the reference numberal 10 an internal combustion engine of the vehicle, which is mounted, in this exemplary case, longitudinally in the front engine room (not particularly shown) of said vehicle. And the reference numeral 20 denotes an automatic speed change device (automatic transmission) of a per se known type mounted to the rear of the engine 10, while 30 denotes a four wheel drive power transfer device which is always operating in so called full time four wheel drive mode, so as always to drive both the rear pair of wheels of the vehicle and also the front pair of wheels of the vehicle, albeit with the differential action provided by this four wheel drive power transfer device 30 being selectably either provided or not provided, as will be explained in detail hereinafter.

In more detail, the automatic speed change device 20 incorporates a fluid torque converter 22 of a per se known construction, and the power input member 28 of this fluid torque converter 22 is connected via an input shaft 12 to and receives rotational power from a crank shaft of the internal combustion engine 10. And the fluid torque converter 22 is housed within a torque converter housing fitted against and secured to the main body of the internal combustion engine 10, while the automatic speed change device 20 comprises a gear transmission mechanism 26, which is likewise housed within a speed change device housing 24 fitted against and secured to the torque converter housing. And the input shaft of the gear transmission mechanism 26 is connected to and receives rotational power from the power output shaft of the fluid torque converter 22; and thereby the gear transmission mechanism 26 receives rotational power from the internal combustion engine 10, with a certain degree of slippage and also torque amplification being provided for said rotational power by the fluid torque converter 22 (unless a lock up clutch thereof, if provided thereto, is activated) as is per so conventional. This gear transmission mechanism 26 may for the purposes of this specification be of a per se known type incorporating various planetary gear mechanisms and friction engaging mechanisms such as clutches and brakes, and, according to selective actuation of said friction engaging mechanisms provided by an electrically controlled electric/hydraulic control mechanism 100 of a per se known sort including various speed change solenoids and so on, provides any one of a plurality of speed reduction stages between its said power input shaft and its power output shaft, its said power output shaft driving the four wheel drive power transfer device 30.

This four wheel drive power transfer device 30 incorporates a center differential device 32 of a planetary gear wheel type for providing full time differential action between the front wheels of the vehicle and the rear wheels of the vehicle during the full time four wheel drive operation thereof. Now the detailed construction of this center differential device 32 will be explained. It comprises a sun gear 40, a ring gear 42, a carrier 34, and a plurality of planetary pinions 38 rotatably mounted to said carrier 34 and meshed between the sun gear 40 and the ring gear 42 and performing planetary movement between them in a per se known manner. The carrier 34 functions as an input member for this center differential device 32, and is rotationally connected to the output shaft of the gear transmission mechanism 26 via a transfer shaft 27 which passes through the central axis of the hollow sun gear 40. The ring gear 42 functions as one power output member for the center differential device 32 for supplying power to the rear wheels of the vehicle, and is rotationally connected to a rear wheel power output shaft 44 which extends out of the four wheel drive power transfer device 30 in the direction to the right as seen in FIG. 1, i.e. towards the rear of the vehicle in this particular exemplary implementation. And the sun gear 40 functions as another power output member for the center differential device 32 for supplying power to the front wheels of the vehicle, and is rotationally connected to a sleeve shaped intermediate front wheel drive shaft 46. This intermediate front wheel drive shaft 46 is hollow and is fitted around the transfer shaft 27, and on its outside there is fixedly mounted a sprocket wheel 50. An endless chain 54 is fitted around this sprocket wheel 50 and also around another sprocket wheel 52 provided below said sprocket wheel 50, from the point of view of the figure and in the actual vehicle body also, and with its central axis parallel to the central axis of said sprocket wheel 50. The sprocket wheel 52 is fixedly mounted on a front wheel power output shaft 28, one end of which protrudes from the housing of this four wheel drive power transfer device 30 in the leftwards direction in the figure, i.e. towards the front end of the vehicle in this particular exemplary implementation.

Thus, the power distribution ration (drive torque distribution) between the intermediate front wheel drive shaft 46 and the rear wheel power output shaft 44, when this four wheel drive power transfer device 30 is operating freely (i.e. a clutch 60 to be described shortly is in the released condition), is determined by the relative tooth counts of the sun gear 40 and the ring gear 42 by the expressions $Rr=1/(1+Rg)$ and $Rf=Rg(1+Rg)$, where Rr is the rear wheel distribution ratio, Rf is the front wheel distribution ratio, and Rg is the ratio of the number of teeth on the sun gear 40 to the number of teeth on the ring gear 42. Because the number of teeth on the sun gear 40 is naturally greater than the number of teeth on the ring gear 42, thus, providing that the nubmer of teeth on the sprocket wheel 50 and the number of teeth on the sprocket wheel 52 are the same, this four wheel drive power transfer device 30 is of the type which distributes a larger amount of torque to the rear vehicle wheels than to the front vehicle wheels.

Within the four wheel drive power transfer device 30 there is provided a hydraulically operated wet type clutch 60, which selectively rotationally connects together the sun gear 40 and the ring gear 42, either completely or partially, or alternatively allows said members to rotate freely with respect to one another. This wet clutch 60, the construction of which will be explained in detail shortly, is selectively operated by supply of actuating hydraulic fluid pressure from an electricaly actuated electric/hydraulic control device 110. Accordingly, the four wheel drive power transfer device 30, which receives rotational power input from the gear transmission mechanism 26 and outputs said rotational power to the rear wheel power output shaft 44 and to the front wheel power output shaft 48, can be caused either to provide differential action for distributing said rotational power between said rear wheel power output shaft 44 and said front wheel power output shaft 48, or not to provide any such differential action and just to drive said shafts 44 and 48 independently, or to provide a condition intermediate between these two extreme conditions, so as to partly allow the center differential device 32 to provide its differential action for distributing said rotational power between said rear wheel power output shaft 44 and said front wheel power output shaft 48 to some extent, while being somewhat impeded by the dragging action of the clutch 60.

Via a universal joint 56 of a per se known sort, the rear end of the rear wheel power output shaft 44 rotationally drives the front end of a rear wheel propeller shaft 58. And the rear end of this rear wheel propeller shaft 58 is connected via another universal joint (not particularly shown) to a differential device, (not particularly shown either), for driving the rear wheels (also not shown) of the vehicle.

And, via a universal joint 82 also of a per se known sort, the front end of the front wheel power output shaft 48 rotationally drives the rear end of a front wheel propeller shaft 84. Thus, this front wheel propeller shaft 84 extends alongside and generally below the casing 24 of the automatic speed change device 20 including the fluid torque converter 22 therein, roughly parallel to the longitudinal axis thereof and on one side thereof. The front end of this front wheel propeller shaft 84 is rotationally connected, via another universal joint 86 also of a per se known sort, via a short intermediate shaft which is supported from the torque converter casing by means of a bearing assembly, and via yet another universal joint 88, to the outer end of a drive pinion shaft 92 which constitutes the power input shaft of a front differential device 90 which drives the front wheels (not shown) of the vehicle. And this drive pinion shaft 92 is also rotatably supported at its intermediate portion from the casing 94 of the front differential device 90 (this casing 94 is integrally formed with the oil pan of the internal combustion engine 10), and the inner end of this drive pinion shaft 92 is provided with a drive pinion 96 which is constituted as a bevel gear, with said drive pinion 96 being meshingly engaged with a driven ring gear 98 of the front differential device 90.

Operation of this Power Train

This vehicle power train operates as follows. When the clutch 60 of the four wheel drive power transfer device 30 is operated by the electrically actuated electric/hydraulic control device 110 so as not at all to rotationally connect together the sun gear 40 and the ring gear 42, then the center differential device 32 functions so as to provide its differential effect between the rear wheel power output shaft 44 and the intermediate front wheel drive shaft 48 in full measure, i.e. so as to receive rotational power provided by the engine 10 of the vehicle and transmitted to said four wheel drive power transfer device 30 via the automatic speed change device 20, and to distribute said rotational power, while providing a non damped differential effect, between the rear wheels of the vehicle taken as a combination and the front wheels of the vehicle taken as a combination. On the other hand, when the clutch 60 of the four wheel drive power transfer device 30 is operated by the electrically actuated electric/hydraulic control device 110 so as to completely rotationally connect together the sun gear 40 and the ring gear 42, i.e. so as to provide an effectively unlimited degree of torque transmission, then the center differential device 32 functions so as to provide no such differential effect at all between the rear wheel power output shaft 40 and the intermediate front wheel drive shaft 42, i.e so as to distribute the rotational power provided from the engine 10 via the automatic speed change device 20 directly to the rear wheels 58 of the vehicle taken as a combination and also to the front wheels 28 of the vehicle taken as a combination in an even fashion without any provision of any differential effect at all. And, in the intermediate case between these two extremes, when said clutch 60 of said four wheel drive power transfer device 30 is operated by said electrically actuated electric/hydraulic control device 110 so as somewhat to rotationally connect together said sun gear 40 and said ring gear 42, i.e. so as to provide a certain relatively limited degree of dragging or torque transmitting effect between these members, then said center differential device 32 functions so as to provide its differential effect between said rear wheel power output shaft 44 and said intermediate front wheel drive shaft 48 to a relatively limited or partial degree, i.e. so as to receive rotational power provided by said engine 10 of said vehicle and transmitted to said four wheel drive power transfer device 30 via said automatic speed change device 20, and to distribute said rotational power, while providing a partially damped differential effect, between said rear wheels of said vehicle taken as a combination and said front wheels of said vehicle taken as a combination.

The Construction of the Central Differential Control Clutch 60

Figure 2:
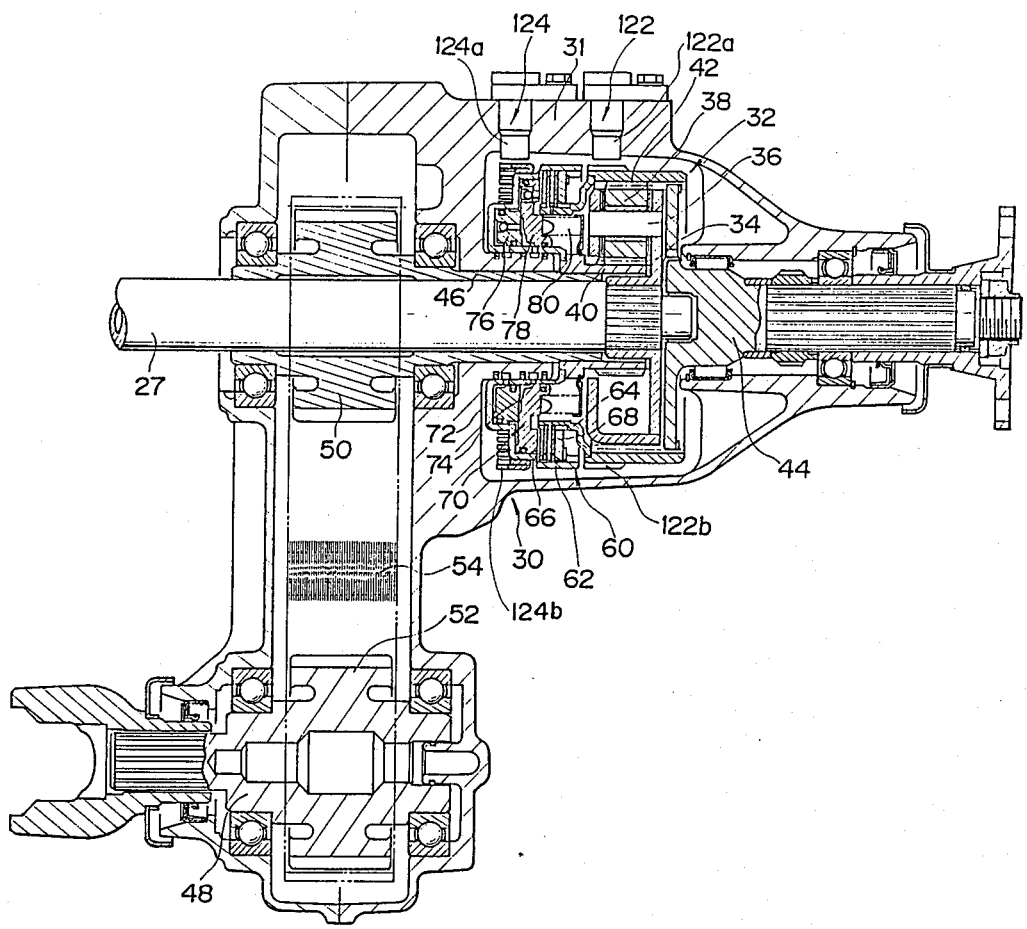
FIG. 2 is a longitudinal sectional view of a torque transfer clutch which is provided to a center differential device of the FIG. 1 power train, and also showing sensors incorporated in said preferred embodiment of the vehicle road speed detection device of the present invention.

In FIG. 2, there is shown a cross sectional view of the four wheel drive power transfer device 30 and of its central differential control clutch 60; however, this particular arrangement should not be taken as limitative of the present invention, as other possibilities for these structures could also be implemented, in alternative embodiments. In this figure, the central differential control clutch 60 is shown as being a hydraulic servo type wet clutch, comprising: a clutch drum member 62 which is rotationally fixed with respect to the sun gear 40 of the center differential device 32; a clutch sleeve member 64 which is rotationally fixed with respect to the ring gear 42 of said center differential device 32; a set of clutch plates 66 which are fitted within and are rotationally fixed with respect to said clutch drum member 62, thus being rotationally fixed with respect to said sun gear 40 of said center differential device 32; and another set of clutch plates 68 which are mutually interleaved in a sandwiched arrangement with said first set of clutch plates 66 and which are rotationally fixed with respect to said clutch sleeve member 64, thus being rotationally fixed with respect to said ring gear 42 of said center differential device 32; and a servo device 70. Thus, when the sets 66 and 68 of clutch plates are squeezed together by the servo device 70 as will be explained shortly, torque transmission between the sun gear 40 and the ring gear 42 of the center differential device 32 is provided in a degree corresponding to the degree of squeezing together of said sets 66 and 68 of clutch plates.

The servo device 70 provided for thus pressing said squeezing together said sets 66 and 68 of clutch plates is of the double chamber type, and comprises twin pressure chambers 72 and 74 and twin servo pistons 76 and 78, all of these members and chambers being annular. The servo pistons 76 and 78, in series, confront the sandwiched together sets 66 and 68 of clutch plates, for opposing said clutch plate sets 66 and 68 and for pressing them together, when said servo pistons 76 and 78 are biased in their direction. And the pressure chambers 72 and 74, when pressurized with hydraulic fluid, thus press the servo pistons 76 and 78 against the clutch plate sets 66 and 68 and squeeze them together. A spring 80 (which in fact is an annular spring) is provided for biasing said servo pistons 76 and 78 in the leftwards direction as seen in FIG. 2, so as to reduce the size of the pressure chambers 72 and 74. Thereby, when no substantial hydraulic fluid pressure is supplied to said pressure chambers 72 and 74, under the biasing action of the spring 80 the servo pistons 76 and 78 are biased in the leftwards direction as seen in the drawing, so as to not substantially compress the superposed sandwich of the clutch plate sets 66 and 68 and thus to let said clutch plate sets 66 and 68 be not substantially mutually engaged; and, thereby, no substantial degree of torque transmission between the sun gear 40 and the ring gear 42 of the center differential device 32 is provided. On the other hand, when a substantial degree of hydraulic fluid pressure is supplied to the pressure chambers 72 and 74, the servo pistons 76 and 78 are biased, against the biasing action of the spring 80 which is overcome, in the rightwards direction as seen in the drawing, so that said servo pistons 76 and 78 press against the compress the superposed sandwich of the clucth plate sets 66 and 68 with a force determined according to the magnitude of the pressure value supplied to said pressure chambers 72 and 74, thereby causing said clutch plate sets 66 and 68 to be mutually engaged together with a torque transmission capability determined according to said magnitude of said pressure value supplied to said pressure chambers 72 and 74; and, thereby, torque transmission between the sun gear 40 and the ring gear 42 of the center differential device 32 is provided, similarly with a magnitude determined according to the magnitude of the pressure value supplied to the pressure chambers 72 and 74.

The electrically actuated electric/hydraulic control device 110, to define its action in a functional sense, supplies a hydraulic fluid pressure of any desired pressure level from substantially zero up to line pressure to the pressure chamber 72 and 74 of this servo device 70, according to the value of an electrical control signal supplied to it. Thereby, by varying the value of said electrical signal, it is possible to vary the degree of torque transmission between the sun gear 40 and the ring gear 42 of the center differential device 32 between substantially zero and a substantially maximum value. This controlling electrical signal is supplied from a transmission control device 120, now to be explained.

The Transmission Control System

Referring to FIG. 1, it will be seen that the following detectors and sensors are provided to this system. A rear wheel rotation speed sensor 122 detects a value which in normal circumstances is representative of the road speed of the vehicle by measuring the rotational speed of a member rotationally coupled to the rear wheel poewr output shaft 44 (details of this rear wheel rotation speed sensor 122 will be explained later), and outputs an electrical signal representative thereof. A front wheel rotation speed sensor 124 detects a value which in normal circumstances is representative of the road speed of the vehicle by measuring the rotational speed of a member rotationally coupled to the intermediate front wheel drive shaft 48 (details of this front wheel rotation speed sensor 124 will likewise be explained later), and outputs an electrical signal representative thereof. A throttle position sensor 126 detects a value representative of the current load on the internal combustion engine 10 by measuring the opening angle of the throttle valve (not particularly shown) of a carburetor (not shown either) of said engine 10, and outputs an electrical signal representative thereof. A set range sensor 128 detects the set position of a manual range setting valve which is provided for the transmission mechanism 20, or of a setting means therefor, and outputs an electrical signal representative thereof; this manual range setting valve is not particularly shown in the figures, but said setting means therefor is provided in the passenger compartment of the vehicle so as to be readily accessible to the driver of the vehicle, and can be set to any one of a number of set positions corresponding to various operational ranges for the transmission mechanism 20 such as "D" range, "20" range, "L" range, "R" range, "N" range, and "P" range. And an input torque sensor 130 senses the input torque (hereinafter designated as "Ti") input to the four wheel drive power transfer device 30 from the automatic speed change device 20, and outputs an electrical signal representative thereof. The output signals of these five sensors and switches 122, 124, 126, 128, and 130 are fed to a transmission control device 120.

This transmission control device 120 outputs control signals for controlling the electric/hydraulic control device 110 for the four wheel drive power transfer device 30 and the electrical/hydraulic control mechanism 100 for the gear transmission mechanism 26, according to principles which incorporate the concept of the vehicle road speed detection device and method of the present invention, as will be explained hereinafter. No concrete illustration of the structure of any particular realization of the transmission control device 120 will be given herein, since various possibilities for the details thereof can be easily supplemented by one of ordinary skill in the electronic and computer programming art based upon the functional disclosures set out in this specification. In the preferred embodiments of the device and the method of the present invention, the transmission control device 120 is concretely realized as a micro computer and its associated circuitry, said micro computer operating at the behest of a control program such as the program whose flow chart is given in FIG. 3 and which will be descirbed hereinafter. However, it should be particularly understood that such realizations in the micro computer form, although preferred, are not the only ways in which the transmission control device 120 can be provided; in other possible embodiments it could be constituted as an electrical device not incorporating a microprocessor. In the preferred case, however, such a microporcessor will typically comprise: a CPU (central processing unit) which obeys said control program to be described shortly and which inputs data, performs calculations, and outputs data; a ROM (read only memory) which stores said program to be described shortly and initialization data therfor and so on; and a RAM (random access memory) which stores the results of certain intermediate calculations and data and so on; and these devices together will constitute a logical calculation circuit, being joined together by a common bus which also links them to an input port and an output port which together perform input and output for the system. And the system will typically also include buffers for the electrical signals outputted from the various sensors and switches 122 through 130 to the input port device, and drive circuits through which actuating electrical signals are passed from the output port device to a speed change control solenoid or solenoids of the electrical/hydraulic control mechanism 100 for controlling the automatic speed change device 20 and to a control solenoid or the like of the electric/hydraulic control device 110 for controlling the torque transmission capacity of the clutch 60 of the four wheel drive power transfer device 30.

It should be understood that the transmission control device 120 generally functions, as will be exemplarily disclosed with reference to the FIG. 3 flow chart in the following, so as to engage an appropriate one of the various speed stages of the gear transmission mechanism 26 of the transmission mechanism 20 according to the current values of various vehicle operating parameters such as the vehicle road speed as sensed by one or the other of the rear wheel rotation speed sensor 122 and the front wheel rotation speed sensor 124 as will be explained in detail shortly, the engine load (throttle opening) as sensed by the throttle position sensor 126, and the operating range of the transmission as manually set by the vehicle driver on the setting means therefor as sensed by the set range sensor 128; such a transmission shift stage selection function may be performed in a per se conventional way, and no particular details thereof will be shown or suggested in this specification, since various possibilities for the details therof can be easily supplemented as appropriate by one of ordinary skill in the transmission control and the programming arts, particularly when based upon the functional disclosures set out in this specification. Further, said transmission control device 120 generally functions so as to control the torque transmission capacity of the clutch 60 of the center differential device 32 of the four wheel drive power transfer device 30, according to the current values of various vehicle operating parameters such as the vehicle road speed as sensed by one or the other of the rear wheel rotation speed sensor 122 and the front wheel rotation speed sensor 124 as will be explained in detail shortly, and the torque currently being inputted to the clutch 60 of the center differential device 32 of the four wheel drive power transfer device 30, as sensed by the input torque sensor 130; such a central differential clutch torque transmission function may be performed in a per se conventional way, or in a way indicated in one or the other of copending U.S. patent applications Ser. Nos. 002,266 filed Jan. 12, 1987, U.S. Ser. No. 008,323 filed Jan. 29, 1987, and U.S. Ser. No. 026,271 filed Mar. 16, 1987, and others, all of which are assigned or owed duty of assignment to an entity the same as the entity assigned or owed duty of assignment of the present patent application, and none of which is it intended hereby to admit as prior art to the present patent application except to the extend in any case required by applicable law. No particular details of this central differential clutch torque transmission function will therefore be shown or suggested in this specification, since various possibilities for the details thereof can be easily supplemented as appropriate by one of ordinary skill in the transmission control and the programming arts particularly when based upon the functional disclosures set out in this specification. That is to say, substantially only the control of the gear transmission mechanism 26 of the transmission mechanism 20 provided by the transmission control device 120 will be considered herein.

Implementation of the Front and Rear Wheels Rotational Speed Sensors

The constructional details of the rear wheel rotation speed sensor 122 and of the front wheels rotation speed sensor 124 will now be disclosed, with particular reference to FIG. 2.

The rear wheel rotation speed sensor 122 comprises an electromagnetic pick up or detection element 122a which is fitted to the housing 31 of the four wheel drive power transfer device 30, and also comprises a toothed element 122b which is formed or fixed on the outer surface of the ring gear 42 of said four wheel drive power transfer device 30. The electromagnetic detection element 122a opposes the toothed element 122b with a small gap separating them, and, as the ring gear 42 rotates—perforce at the same rotational speed as the rear wheel power output shaft 44 since they are rotationally coupled together—and thus, as the teeth of said toothed element 122b pass said electromagnetic detection element 122a in sequence, said electromagnetic detection element 122a produces a pulsed electrical signal, the frequency of which is directly proportional to the rotational speed of the rear wheel power output shaft 44, i.e. to the actual rotational speed of the rear wheels (not particularly shown) of the vehicle.

Similarly, the front wheel rotation speed sensor 124 comprises an electromagnetic pick up or detection element 124a which is also fitted to the housing 31 of the four wheel drive power transfer device 30, and also comprises a toothed element 124b which is formed or fixed on the outer surface of the clutch drum 62 (which is fixed to the sun gear 40) of said four wheel drive power transfer drive 30. The electromagnetic detection element 124a opposes the toothed element 124b with a small gap separating them, and, as the clutch drum 62 and the sun gear 40 rotate—perforce at the same rotational speed as the intermediate front wheel drive shaft 48 since they are rotationally coupled together—and thus, as the teeth of said toothed element 124b pass said electromagnetic detection element 124a in sequence, said electromagnetic detection element 124a produces a pulsed electrical signal, the frequency of which is directly proportional to the rotational speed of said intermediate front wheel drive shaft 48, i.e. to the actual rotational speed of the front wheels (not particularly shown) of the vehicle.

In particular, according to this preferred embodiment of the vehicle road speed detection device and the method of the present invention, the electromagnetic detection elements 122a and 124a are fitted closely to the housing 31 of the four wheel drive power transfer device 30 and are also located close to one another, and this makes maintenance easy and allows for the sharing of one wiring harness branch between said two electromagnetic detection elements 122a and 124a, thus economizing on materials and rendering construction easier. Further, in these preferred vehicle road speed detection device and method embodiments, these two electromagnetic detection elements 122a and 124a are situated at substantially the same radial distances from the common rotational axis of their toothed elements 122b and 124b, and further said two toothed elements 122b and 124b are of substantially the same diameters and have the same number of teeth on them, and therefore the ratio of the rotational speed of the toothed element 122b which relates to the rotational speed of the rear vehicle wheels to the frequency of the pulse signal outputted by the corresponding electromagnetic detection element 122a is the same as the ratio of the rotational speed of the toothed element 124b which relates to the rotational speed of the front vehicle wheels to the frequency of the pulse signal outputted by the corresponding electromagnetic detection element 124a. Accordingly, in order to compare the rotational speeds of the front vehicle wheels and of the rear vehicle wheels as is done according to the present invention as will be explained hereinafter, it will be sufficient to compare directly the frequencies of the pulse signal outputted by the one electromagnetic detection element 122a in response to the passing of the teeth of the toothed element 122b and the pulse signal outputted by the other electromagnetic detection element 124a in response to the passing of the teeth of the other toothed element 124b. This considerably simplifies the operation of the device of the present invention and the implementation of the method of the present invention.

Operation of This System

Figure 3:
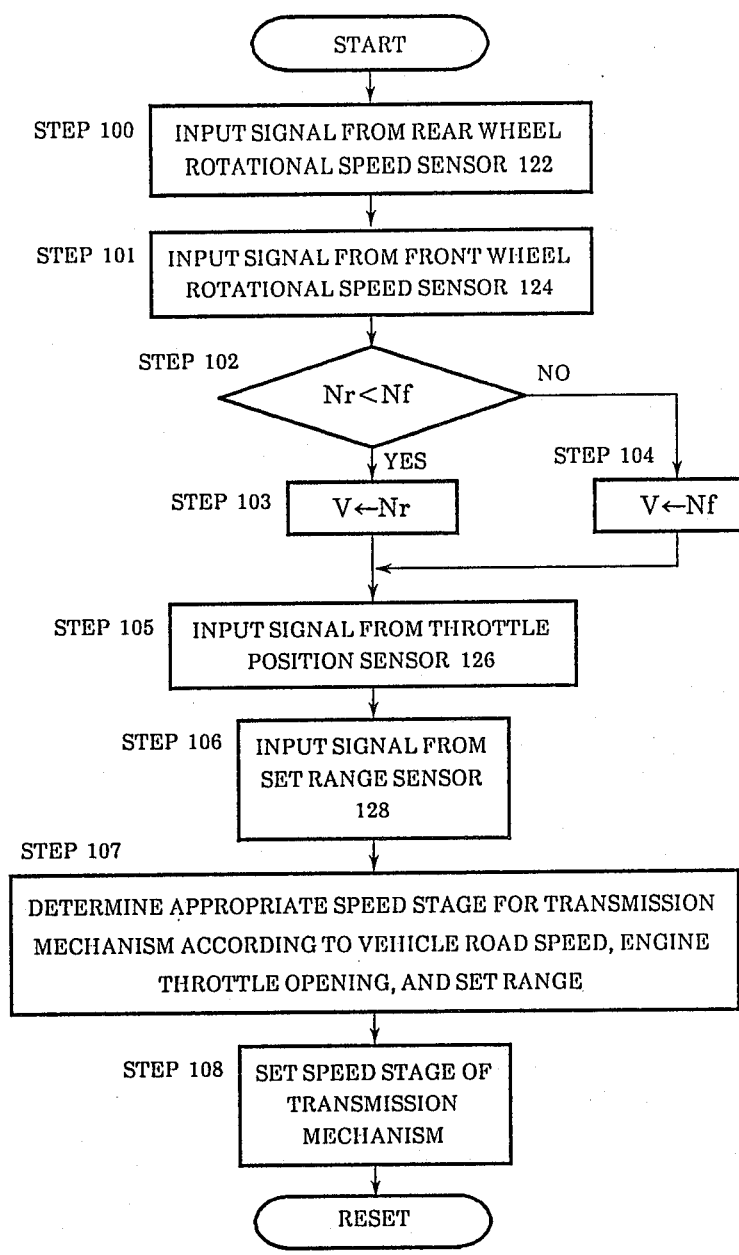
FIG. 3 is a flow chart of a portion of a program which controls a microcomputer incorporated in a transmission control device shown in FIG. 1, for explaining the principles of the control exercised therby.

Now, in FIG. 3, a fragmentary flow chart is shown for a portion of the aforementioned control program which directs the operation of the transmission control device 120, according to the preferred embodiment of the four wheel drive vehicle road speed detection device of the present invention, so as to realize the preferred embodiment of the four wheel drive vehicle road speed detection method of the present invention. This flow chart will now be explained; no particular programming steps for implementing said flow chart are shown or suggested in this specification, since various possiblities for the details thereof can be easily supplemented as appropriate by one of ordinary skill in the programming art, particularly when based upon the functional disclosures set out in this specification. The flow chart of FIG. 3 only shows the portion of the control program of the transmission control device 120 which controls the gear transmission mechanism 26 of the transmission mechanism 20, i.e. does not show the portion of said control program relating to the control provided for the clutch 60 of the center differential device 32 of the four wheel drive power transfer device 30; this fragment will be sufficient for exemplifying the principles of the present invention. This program portion is executed at regular intervals of for example a few milliseconds, of course after the engine 1 is started as the vehicle incorporating it is driven.

In the first step ST100 to which control is passed after the start of this program fragment, the transmission control device 120 inputs the pulsed electrical signal from the electromagnetic detection element 122a of the rear wheel rotation speed sensor 122, which is taken as representing a rear wheel rotational speed Nr, and then the flow of control passes next to the next step ST101.

In this next step ST101, the transmission control device 120 inputs the pulsed electrical signal from the electromagnetic detection element 124a of the front wheel rotation speed sensor 124, which is taken as representing a front wheel rotational speed Nf, and then the flow of control passes next to the next decision step ST102.

In this decision step ST102, a decision is made as to whether or not the value of Nr, just obtained, is less than the value of Nf, just obtained. If the result of this decision is YES, so that in fact Nr<Nf, then the flow of control passes next to the step ST103; but, if the result of this descision is NO, so that in fact Nr>Nf, then the flow of control passes next to the step ST104.

In the step ST103, at which point it has been determined that Nr<Nf, the value of the road speed V of the vehicle is set to be equal to the lesser of these values, which in this case is the value Nr, and then the flow of control passes next to the step ST105.

On the other hand, in the step ST104, at which point it has been determined that Nr>Nf, the value of the road speed V of the vehicle is similarly set to be equal to the lesser of these values, which in this case is the value Nf, and then the flow of control similarly passes next to the step ST105.

Thus, at this point of the flow chart, the vehicle speed V has been set to the lesser of the values indicated by the rear wheel rotation speed sensor 122 and the front wheel rotation speed sensor 124. This is appropriate because it is possible, if one of the rear wheels of the vehicle is slipping or skidding or spinning, that the output signal Vr from said rear wheel rotation speed sensor 122 might give a spurious result for the road speed of the vehicle, and in such a case said spurious result would be too high, but in such a case the output signal Vf from the front wheel rotation speed sensor 124 would likely give a correct result for the road speed of the vehicle; and, conversely, it is possible, if one of the front wheels of the vehicle is slipping or skidding or spinning, that the output signal Vf from the front wheel rotation speed sensor 124 might give a spurious result for the road speed of the vehicle, and similarly in such a case said spurious result would be too high, but in such a case the output signal Vr from the rear wheel rotation speed sensor 122 would likely give a correct result for the road speed of the vehicle. Accordingly, it is considered to be very likely that the lesser of the values Vf and Vr, provided by the rear wheel rotation speed sensor 122 and the front wheel rotation speed sensor 124, is the one which is the more reliable, and thus according to the principle of the four wheel drive vehicle road speed detection device and method of the present invention, it is said lesser value which is taken as representing true vehicle road speed.

In the next step ST105, the transmission control device 120 inputs the pulsed electrical signal from the throttle position sensor 126, which is taken as representing the load on the internal combustion engine 100 of the vehicle, and then the flow of control passes to the next step ST106.

In this next step ST106, the transmission control device 120 inputs the pulsed electrical signal from the set range sensor 128, which represents which operational range such as "D" range, "2" range, or the like for the gear transmisison mechanism 26 of the transmission mechansim 20 it is desired by the vehicle operator that said gear transmission mechanism 26 should be operated in, and then the flow of control passes next to the step ST107.

In this next step ST107, the transmission control device 120 determines, based upon the current values of vehicle road speed V just determined and upon the output signals from said throttle position sensor 126 and said set range sensor 128, and according to a map stored in a ROM incorporated therein or the like, what is an appropriate speed stage for said gear transmission mechanism 26 of said transmission mechanism 20 to be currently engaged to, and then the flow of control passes next to the step ST108.

In this next step ST108, the transmission control device 120 performs the actual engagement of the speed stage of said gear transmission mechanism 26 of said transmission mechanism 20 determined upon in the previous step ST107, and then the flow of control passes next to exit this program fragment, without doing anything further. And this program fragment is repeated fairly frequently, at all times when the vehicle incorporating the power train of FIG. 1 is being operated.

Thereby, the appropriate speed stage of the gear transmission mechanism 26 of the transmission mechanism 20 is engaged, substantially at all times, and particularly said appropriate speed stage is determined according to a value V of vehicle road speed which is determined as being the lesser of the values indicated by the rear wheel rotation speed sensor 122 and the front wheel rotation speed sensor 124. Accordingly, since the vehicle road speed is determined according to that one of the rotational speed of the front wheels rotational power output member (the intermediate front wheel drive shaft 48) and the rotational speed of the rear wheels rotational power output member (the rear wheel power output shaft 44) which is the lesser one thereof and accordingly (in the event of substantial disagreement between said rotational speeds) is the one thereof whose value is not being caused to be a spurious representation of vehicle road speed due to slippage of one or more of the front or the rear vehicle wheels upon the surface of the road, thereby it becomes possible according to the present invention to accurately detect vehicle road speed even if one of the vehicle wheels is spinning relatively quickly due to slippage of that vehicle wheel upon the road surface. Accordingly, it becomes possible to accurately detect vehicle road speed even in adverse driving conditions in which the surface of the road which is being driven upon is relatively slippery, thus entailing relatively poor adhesion of the vehicle wheels to the surface of the road. In such conditions, this vehicle road speed detection device and method according to the disclosed preferred embodiment of the present invention ensure that vehicle drivability is not ever adversely deteriorated due to improper speed stage engagement.

Further, by the particular disclosed construction of the rear wheel rotation speed sensor 122 and the front wheel rotation speed sensor 124, the rotational speeds of said front wheels rotational power output member and of said rear wheels rotational power output member can be easily detected. Also, because of the shown construction in which the frequency of the output pulse electrical signal from the electromagnetic detection element 122a of the rear wheel rotation speed sensor 122 should, if no slippage of any vehicle wheel is occurring, be substantially the same as the frequency of the output pulse electrical signal from the electromagnetic detection element 124a of the front wheel rotation speed sensor 124, thereby comparison of these signals is made easy, and accordingly easy signal processing is facilitated, and furthermore this vehicle road speed detection device, and a means to implement this vehicle road speed detection method, are simple in construction. This simplicity of construction is enhanced by the fact that the electromagnetic detection element 122a of the rear wheel rotation speed sensor 122 and the electromagnetic detection element 124a of the front wheel rotation speed sensor 124 are mounted close together.

By this construction, the present invention is economical of constructional materials, and the transmission as a whole is easy to assemble, and is compact and is easily serviced. Accordingly, the vehicle as a whole is enabled to be of low cost.

Conclusion

It is acceptable, according to the principle of the present invention if the constructional details of the rear wheel rotation speed sensor 122 and the front wheel rotation speed sensor 124 are varied, although the shown ones are considered to be preferred. Other modifications could also be conceived of. Therefore, although the present invention has been shown and described in terms of the preferred embodiments thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the scope of the accompanying claims, which follow.

What is claimed is:

1. A four wheel drive power transmission system for a vehicle having two pairs of wheels, an engine, and a transmission, comprising:

a planetary gear mechanism including a sun gear, a ring gear, a plurality of planetary pinions, and a carrier;

an input shaft drivingly connected with said transmission, said input shaft being coaxial with said planetary gear mechanism, conducted through said sun gear, and rotationally connected with said carrier;

a first output shaft for driving a first pair of said four wheels, said first output shaft being a tubular shaft coaxially arranged around said input shaft and rotationally connected with said sun gear;

a second output shaft for driving a second pair of said four wheels, said second output shaft being coaxial with said planetary gear mechanism, rotationally connected with said ring gear, and extending from one end thereof connected with said ring gear in an axial direction opposite to said first output shaft;

a clutch for selectively rotationally connecting said sun gear with said ring gear, said clutch comprising an annular casing member including an inner cylindrical portion rotationally connected with said sun gear, an outer cylindrical portion and an annular disk portion connecting said inner cylindrical portion with said outer cylindrical portions so as to provide a C-shaped cross sectional structure, an intermediate cylindrical member rotationallly connected with said ring gear and defining an annular cylindrical space with said outer cylindrical portion of said casing member, a plurality of annular friction disk elements disposed in said annular cylindrical space between said outer cylindrical portion of said casing member and said intermediate cylindrical member, each alternate one of said friction disk elements being rotationally connected with either said outer cylindrical portion of said casing member or said intermediate cylindrical member, and an annular piston member disposed in an annular space of said C-shaped cross sectional structure of said casing member so as to provide an annular cylinder-piston type actuator for selectively compressing said friction disk elements to one another;

a first series of unevenness provided along a circumferential portion of a said outer cylindrical portion of said casing member;

a second series of unevenness provided along a circumferential portion of said ring gear;

a first sensor for detecting each one of said first series of unevenness, said first sensor providing a first signal representing rotational speed of said sun gear; and a second sensor for detecting each one of said second series of unevenness, said second sensor providing a second signal representing rotational speed of said ring gear.

2. A four wheel drive power transmission system according to claim 1, wherein said first series of unevenness is arranged along a first circle, said second series of unevenness is arranged along a second circle which is coaxial with and of the same diameter as said first circle.

3. A four wheel drive power transmission system according to claim 2, wherein the number of said first series of unevenness is the same as that of said second series of unevenness.

* * * * *